(12) United States Patent
Stahlbush et al.

(10) Patent No.: US 6,290,854 B1
(45) Date of Patent: Sep. 18, 2001

(54) TREATMENT OF POWER PLANT CONDENSATE WATER WITH ION EXCHANGE RESINS

(75) Inventors: James R. Stahlbush; Kenneth L. Foster, both of Midland, MI (US)

(73) Assignee: The Dow Chemical Company, MIdland, MI (US)

( * ) Notice: Subject to any disclaimer, the term of this patent is extended or adjusted under 35 U.S.C. 154(b) by 0 days.

(21) Appl. No.: 09/454,757

(22) Filed: Dec. 6, 1999

Related U.S. Application Data

(60) Provisional application No. 60/111,481, filed on Dec. 9, 1998.

(51) Int. Cl.[7] .................................................. C02F 1/42
(52) U.S. Cl. ........................... 210/686; 210/688; 210/912
(58) Field of Search ..................................... 210/686, 688, 210/685, 912

(56) References Cited

U.S. PATENT DOCUMENTS

| | | | |
|---|---|---|---|
| Re. 34,112 | 10/1992 | Ma | 210/686 |
| 4,419,245 | 12/1983 | Barrett et al. | 210/681 |
| 4,564,644 | 1/1986 | Harris | 521/28 |
| 4,657,731 | 4/1987 | Otte et al. | 376/313 |
| 4,973,607 | 11/1990 | Stahlbush et al. | 521/28 |
| 5,068,255 | 11/1991 | Harris | 521/28 |
| 5,192,446 | 3/1993 | Salem et al. | 210/685 |
| 5,231,115 | 7/1993 | Harris | 521/28 |
| 5,248,435 | * 9/1993 | Morita et al. | 210/681 |
| 5,308,876 | 5/1994 | Kawazu et al. | 521/28 |
| 5,387,348 | * 2/1995 | Hagiwara et al. | 210/662 |
| 5,397,477 | 3/1995 | Salem et al. | 210/683 |
| 5,403,492 | * 4/1995 | Salem et al. | 210/683 |
| 5,431,824 | 7/1995 | Kawazu et al. | 210/686 |
| 6,110,994 | * 8/2000 | Cooke et al. | 523/215 |

FOREIGN PATENT DOCUMENTS

| | | |
|---|---|---|
| 2058002 | 6/1993 | (CA) . |
| 0 295 562 | 12/1988 | (EP) . |
| 63-281279 | 11/1988 | (JP) . |
| 62-335614 | 12/1988 | (JP) . |

OTHER PUBLICATIONS

"Gel–Type Copolymer Beads and Ion Exchange Resins Made Therefrom", J. R. Stahlbush et al, U.S. application No. 09/426,535, filed Oct. 26, 1999.

Inami et al., "Mechanism of Crud Removal by Deep Bed Resins", Proceedings of the 50$^{th}$ International Water Conference, IWC–89–51, pp. 552–557 (1989).

Izumi et al., "Crud Removal Characteristics of Newly Developed Ion Exchange Resins", Proceedings of the 50$^{th}$ International Water Conference, IWC–89–52, pp. 558–565 (1989).

Izumi et al., "Crud Removal Characteristics of Newly Developed Ion Exchange Resins (2$^{nd}$ Report)", Proceedings of the 52$^{nd}$ International Water Conference, IWC–91–57, 453–460 (1991).

Izumi et al., "Crud Removal Characteristics of Newly Developed Ion Exchange Resins (3$^{rd}$ Report)", Proceedings of the 55$^{th}$ International Water Conference, IWC–94–41, pp. 347–353 (1994).

Izumi et al., "Application of the New Gel–Type Crud Removal Resins to an Actual Condensate Demineralizer", Proceedings of the 56$^{th}$ International Water Conference, IWC–95–54, pp. 537–543 (1995).

Otoha et al., "Crud Removal Performance with Ion Exchange Resins in BWR Plants", J. Nuclear Sci. and Tech., V. 33, #1, pp. 52–61 (Jan. 1996).

Kosanda et al., "Development of High Performance Resin for BWR's Condensate Demineralizers", Proceedings of the 58$^{th}$ International Water Conference, IWC–97–09, pp. 131–136 (1997).

Stahlbush et al., "Identification, Prediction and Consequence of the Decomposition Products from Cation Exchange Resins", Ion Exchange for Industry, M. Streat, Ed., Ellis Horwood Ltd., pp. 22–33 (1988).

Najmy et al., "TOC Leachables from Dowex™ Guardian™ and HGR–W2 Cation Exchange Resins", Proc EPRI Workshop on Condensate Polishing, pp. 14/1–14/12 (9/97).

Stahlbush et al., "A Decomposition Mechanism for Cation Exchange Resins", Reactive Polymers, V. 13, pp. 233–240 (1990).

Trommsdorff et al., "Polymerizations in Suspension", pp. 69–109, Polymerization Process, ed. Calvin E. Schildknecht and Irving Skeist, N.Y. Wiley (1977).

Deguchi et al., "Development and One Vessel Test of Low Leachable Crud Removal Resins", Proceedings of the 59$^{th}$ International Water Conference, IWC–98–39, pp. 271–275 (1998).

Copy of International Search Report from Corresponding PCT/US99/28653.

* cited by examiner

Primary Examiner—Peter A. Hruskoci
(74) Attorney, Agent, or Firm—Edward W. Black

(57) ABSTRACT

A water treatment module and process for treating power plant condensate water utilizing a sulfonated ion exchange resin comprising copolymer beads having an interpenetrating polymer network of at least two polymer components wherein at least one of the polymer components is derived from a monomer mixture having a styrenic content less than about 80 molar percent. In one preferred embodiment the multiple polymer components include: (i) a first polymer component derived from a first monomer mixture comprising a monovinylidene monomer having a styrenic content less than about 50 molar percent and (ii) a second polymer component derived from a second monomer mixture comprising: a second monovinylidene monomer having a styrenic content greater than about 50 molar percent and a crosslinking agent. The ratio of the molar percent crosslinking agent of the first polymer component to the second polymer component is less than about 0.7. The present invention is more effective at removing colloidal iron from condensate water, releases fewer total leachables, releases leachables of a lower molecular weight and/or releases leachables having a reduced sulfonate content.

19 Claims, No Drawings

TREATMENT OF POWER PLANT CONDENSATE WATER WITH ION EXCHANGE RESINS

CROSS-REFERENCE TO RELATED APPLICATION

This application claims the benefit of U.S. Provisional Application No. 60/111,481, filed Dec. 9, 1998, the entire contents of which are incorporated herein by reference.

BACKGROUND OF THE INVENTION

Regular treatment of the condensate water of power plants is necessary for preventing corrosion and maintaining efficient water flow rates. Condensate water commonly contains dissolved and suspended (colloidal) materials, especially oxidized iron commonly referred to as "crud". If not maintained at low levels, crud can build up within the steam loop of the power plant causing pressure build up, reduced flow rates, reduced plant efficiency and expensive repairs. Proper crud removal is particularly important in boiling water nuclear reactors (BWRs) where crud can become radioactive as a result of passing through the "hot" side of the steam loop.

Conventional resins, (ie., styrene-based non-seeded resins) have been used in the treatment of condensate water; however, conventional resins typically remove less than 70 percent of crud from the condensate water. Moreover, conventional resins typically have a cycle time of from two to four weeks after which the crud must be removed from the resin bed.

Ion exchange resins made from seeded process have been shown to remove relatively higher percentages of crud from condensate water. For example, U.S. Pat. Nos. 4,975,201 (Re. 34,112), reissued Oct. 27, 1992, (incorporated herein by reference), discloses processes for treating power plant condensate water by contacting the water with a mixed bed ion exchange resin comprising cation and anion microporous copolymer beads. These beads include an interpenetrating network of polymer components made by way of known suspension "seeded" polymerization methodologies. As described, the copolymer beads may be made by a variety of seeded polymerization techniques including in situ-type single and second stage processes. These techniques typically include forming polymeric seed particles (e.g., a first polymer component), suspending the seeds in a suitable suspension medium and continuously adding ("con-add") a polymerizable monomer (e.g., a second polymer component) thereto, thereby forming an interpenetrating polymer network. In one alternative approach, the seeds are imbibed with a monomer mixture (e.g., a third polymer component) which is substantially polymerized prior to the subsequent addition of the second polymer component noted above. As indicated, suspension polymerization methodologies are well known in the art, see for example U.S. Pat. No. 4,564,644, which is incorporated herein by reference. A similar resin for use in condensate water treatment is described in Canadian Patent No. 2,058,022. These resins have been found to have a high capacity for removing crud from condensate water in BWR nuclear power plants. Unfortunately, these resins are highly sensitive to influent crud concentration. As such, the crud removal performance of these resins decreases dramatically with increasing influent crud concentration.

One drawback with current cation exchange resins (especially resin made using a seeded process) is that they degrade with time to release a variety of sulfonated organic compounds. The mechanism for this resin degradation is believed to be due to an oxidative attack at the benzylic carbon groups of the resins. Subsequent chemical reactions cause the breakage of the copolymer chains. When two or more breakages occur between crosslinked groups, sulfonated organic compounds, ie., "leachables", are formed which can diffluse out of the resin and into the surrounding water. The molecular weight of these leachables is typically between 150 and 100,000 daltons. Under the high operating temperatures of the steam loop, these leachables can subsequently desulfonate and release highly corrosive inorganic sulfate into the water.

Anion exchange resins are effective at removing cation exchange resin leachables from solution so long as the total amount of leachables are low and so long as the molecular weight of the leachables is relatively low, i.e., below 10,000 (more preferably below about 5,000, and most preferably below about 1,000). Higher molecular weight leachables from the cation exchange resin are not effectively removed from solution by an anion exchange resin. As such, these leachables remain in the process water as an impurity. Additionally, high molecular weight leachables adsorbed by an anion exchange resin can lead to decreased kinetic performance of the anion exchange resin. Thus, it is desirable to reduce the average molecular weight of the cation exchange resin leachables while minimizing the total amount of leachables released into the process stream.

One way to reduce the total amount of leachables released by the cation exchange resin is to incorporate an antioxidant into the resin as described in U.S. Pat. No. 4,973,607; however, improved cation exchange resins are sought which release lower molecular weight leachables, and which release lower amounts of total leachables even without the addition of such antioxidants. It is further desired to provide cation exchange resins which provide improved crud removal properties.

Another approach to reducing leachables from cation exchange resins is to increase the extent of crosslinking of each polymer component used therein. Although the use of increased crosslinking does not reduce oxidative attack of benzylic carbon atoms, it does reduce the likelihood that any given cleavage of a benzylic bond will lead to a leachable species. Unfortunately, with conventional exchange resins the degree of crosslinking and capacity for crud removal are somewhat inversely related. Thus, as the extent of crosslinking is increased to reduce leachables, capacity for crud removal is compromised.

SUMMARY OF THE INVENTION

The present invention is a water treatment module and process for treating power plant condensate water utilizing a sulfonated ion exchange resin comprising copolymer beads having an interpenetrating polymer network of at least two polymer components wherein at least one of the polymer components is derived from a monomer mixture having a styrenic content less than about 80 molar percent.

An object of the present invention is to provide a water treatment module and process for treating power plant condensate water which is more effective at removing colloidal iron from condensate water, releases fewer total leachables, releases leachables of a lower molecular weight, and/or releases leachables having a lower sulfonate content.

The subject water treatment module and process find particular utility in applications for boiling water reactors of nuclear power plants.

DETAILED DESCRIPTION OF THE INVENTION

As described above, conventional styrenic exchange resins made via non-seeded process typically remove less than about 70 percent crud from condensate water and need to be removed from service and the entrapped crud removed (back-washed) relatively often, i.e., from 10 to about 20 days. Styrenic-type resins made from seeded process remove relatively larger percentages of crud, i.e., from about 80 to about 97 percent. It has recently been discovered that crud removal can be further increased, i.e., to about 99 percent, by reducing the styrenic content of at least one of the polymer components of resin. For example, by replacing over twenty percent of the styrenic content of the seed used in the seeded polymerization with an acrylate, higher percent crud removal values have been achieved. Moreover, the time between required recycling (i.e., back-washing) has been significantly extended compared to conventional resins.

As indicated previously, the mechanism for cation exchange resin degradation is believed to be due to oxidative attack at the benzylic carbon groups of the resins. Subsequent chemical reactions cause the breakage of the copolymer chains leading to "leachables" (ie., cleaved portions of the crosslinked resin) which diffuse out of the resin and into the surrounding water. It has been discovered that by selectively reducing the styrenic content of the polymer components most susceptible to oxidative attack (i.e., those having relative lower molar percent crosslinking agent), one can significantly reduce the average molecular weight, the total quantity of leachables and/or reduce the sulfonate content of the leachables. For example, conventional seeded sulfonated resins useful in treating power plant condensate water comprise a seed component consisting of lightly crosslinked polystyrene, along with additional polymer components, (e.g., imbibed and/or continuously added) consisting of higher crosslinked polystyrene. By replacing at least 20 molar percent (more preferably at least 40, 50, 80 and even 90 percent) of the styrene content in the polymer component having the lowest degree of crosslinking (e.g., the seed component) with a non-styrenic monomer (e.g., acrylate, methacrylate, butadiene, ethylene, propylene, acrylonitrile, vinylidene chloride and vinyl chloride), one can produce a strong, high capacity resin having lower total leachables, leachables of a significantly reduced average molecular weight, and/or leachables having a reduced sulfonate content while simultaneously maintaining and even increasing the crud removal properties of the resin.

Pursuant to the present invention, the polymer component(s) that preferably have styrenic contents below about 80 molar percent (and more preferably below 50 or even 10 molar percent) are determined by the ratio between the molar percent crosslinking agent of any two polymer components. More specifically, if the ratio between the molar percent crosslinking agent of any two polymer components is less than about 0.7 (preferably less than about 0.4 and more preferably less than about 0.1), then the polymer component having the lower molar percentage of crosslinking agent preferably has a monovinylidene monomer with a styrenic content of less than about 80 molar percent. When determining the aforementioned ratio, the polymer component having the lesser molar percent crosslinking agent is the numerator and the polymer component having the relative greater molar percent crosslinking agent is the denominator. In some embodiments of the present invention, a polymer component may include no crosslinking agent, in which case the aforementioned ratio is zero, i.e., less than about 0.7.

Although not required, the polymer component having the absolute lowest molar quantity of crosslinking agent preferably has a styrenic content of less than 80 (and preferably 50) molar percent. Depending upon the specific application, operating conditions and relative weight ratios of each polymer component, it may be desirable to have all polymer components which satisfy the aforementioned ratio to have less than about 80 molar percent styrenic content; however, for purposes of this invention, only one of the polymer components which satisfy the aforementioned criteria need to have a styrenic content less than 80 molar percent.

As used herein, the term "polymer component" refers to the polymeric material resulting from a distinct polymerization step. For example, the resins of the present invention are preferably "seeded" resins. Thus, the formation of the seed particles constitutes a distinct polymer component. Similarly, the process step of imbibing and polymerizing a monomer mixture into the seed constitutes yet another polymer component. If used, the subsequent continuous addition of a monomer mixture commonly used to "grow up" the seed also constitutes a distinct polymer component. Except as specifically described herein, the constituents of each polymer component may be the same or different. Moreover, the monomer mixture used during a polymerization step need not be homogeneous; that is, the ratio and type of monomers may be varied. The term "polymer component" is not intended to mean that the resulting resin have any particular morphology other than an interpenetrating polymer network; however, the present resins typically have a "core-shell" type structure as is described in U.S. Pat. Re No. 34,112. The polymer components of the present invention preferably include polymeric material which contributes more than about 5 weight percent of the final polymerized copolymer bead. Typically, the resins of the present invention comprise two or three polymer components, i.e., a seed component, imbibe component, and/or a continuous addition component. Those skilled in the art will appreciate that different or additional combinations of polymer components may be used, e.g., multiple con-add components may be utilized. The first, second, third, etc. polymer components do not necessarily correspond to an order of addition. That is, the "first polymer component" does not necessarily correspond to the polymer component which is first polymerized, e.g., a seed particle. The terms "first" and "second" are only used to distinguish one component from another, not to designate an order of addition.

The term "monovinylidene monomer" is intended to include homogeneous monomer mixtures and mixtures of different types of monomers, e.g., styrene and isobornyl-methacrylate. Similarly, the term "crosslinking agent", "crosslinker" and "crosslinking monomer" are intended to include both a single species of crosslinking agent along with combinations of different types of crosslinking agents. The term "styrenic content" refers to quantity of monovinylidene monomer units of styrene and/or substituted styrene. Substituted styrene includes substituents of either/or both the vinylidene group and benzyl group of styrene, e.g., vinyl naphthalene, alpha alkyl substituted styrene (e.g., alpha methyl styrene) alkylene-substituted styrene (particularly monoalkyl-substituted styrene such as vinyltoluene and ethylvinylbenzene) and halo-substituted styrene, such as bromo- or chlorostyrene and vinylbenzylchloride.

The copolymer beads of the present invention are preferably prepared by suspension polymerization of a finely divided organic phase comprising monovinylidene monomers, polyvinylidene monomers such as divinylbenzene, a free-radical initiator and, optionally, a phase-separating diluent. The copolymer beads produced may be microporous, i.e., gellular in character, or macroporous, the result depending upon whether the phase-separating diluent is employed. The term "macroporous" as commonly used in the art means that the copolymer has both macropores and mesopores. The terms "microporous", "gel" and "macroporous" are well known in the art and generally describe the nature of the copolymer bead porosity. Microporous or gel copolymer beads have pore sizes on the order of less than about 20 Angstroms (Å), while macroporous copolymer beads have both mesopores of from about 20 Å to about 500 Å and macropores of greater than about 500 Å. Gel and macroporous copolymer beads, as well as their preparation, are further discussed in U.S. Pat. Nos. 5,231,115 and 4,256,840, both incorporated herein by reference.

As indicated, the resins of the present invention are preferably made by way of a seeded polymerization. Seeded polymerizations, also known as continuous or semi-continuous staged polymerizations, are generally described in U.S. Pat. Nos. 4,419,245 and 4,564,644, the relevant teachings of which are incorporated herein by reference. A seeded polymerization process typically adds monomers in two or more increments, each increment comprising at least about 5 percent, and preferably at least about 10 percent of the weight of the resulting copolymer beads. Each increment is followed by complete or substantial polymerization of the monomers therein before adding a subsequent increment.

A seeded polymerization is advantageously conducted as a suspension polymerization wherein monomers, or mixtures of monomers and seed particles, are dispersed and polymerized within a continuous suspending medium. In such a process, staged polymerization is readily accomplished by forming an initial suspension of monomers, wholly or partially polymerizing the monomers to form seed particles, and subsequently adding remaining monomers in one or more increments. Each increment may be added at once or continuously. Due to the insolubility of ethylenically unsaturated monomers in the suspending medium and their solubility within the seed particles, the monomers are imbibed by the seed particles and polymerized therein. Multistaged polymerization techniques can vary in the amount and type of monomers employed for each stage, as well as the polymerizing conditions employed.

The seed particles employed may be prepared by known suspension polymerization techniques. In general, the seed particles may be prepared by forming a suspension of a first monomer mixture in an agitated, continuous suspending medium, as described by F. Helfferich in Ion Exchange, (McGraw-Hill 1962) at pp. 35–36. The first monomer mixture comprises at least one first monovinylidene monomer, a first crosslinking monomer, and an effective amount of a first free-radical initiator. The suspending medium may contain one or more suspending agents commonly employed in the art. Polymerization is initiated by heating the suspension to a temperature of generally from about 50° C. to about 90° C. The suspension is maintained at such temperature until reaching a desired degree of conversion of monomer to copolymer. Other suitable polymerization methods are described in U.S. Pat. Nos. 4,444,961; 4,623,706; and 4,666,673.

The monomers employed herein are addition polymerizable ethylenically unsaturated compounds. Such monomers are well-known and reference is made to *Polymer Processes*, edited by Calvin E. Schildknecht, published in 1956 by Interscience Publishers, Inc., New York, Chapter III, "Polymerization in Suspension" at pp. 69–109, for purposes of illustration. In Table II, on pp. 78–81, of Schildknecht are listed diverse kinds of monomers which are suitable in practicing this invention. Of such ethylenically unsaturated monomers, of particular interest are water-insoluble monovinylidene monomers including the monovinylidene aromatics such as styrene and substituted styrene, e.g., vinyl naphthalene, alpha alkyl substituted styrene (e.g., alpha methyl styrene) alkylene-substituted styrenes (particularly monoalkyl-substituted styrenes such as vinyltoluene and ethylvinylbenzene) and halo-substituted styrenes, such as bromo- or chlorostyrene and vinylbenzylchloride; and monovinylidene non-styrenics such as: esters of $\alpha,\beta$-ethylenically unsaturated carboxylic acids, particularly acrylate or methacrylate acid, methyl methacrylate, isobomylmethacrylate, ethylacrylate, and butadiene, ethylene, propylene, acrylonitrile, and vinyl chloride; and mixtures of one or more of said monomers. Preferred monovinylidene monomers include styrene, acrylates and methacrylates. Examples of crosslinking monomers, (ie., polyvinylidene compounds) include polyvinylidene aromatics such as divinylbenzene, divinyltoluene, divinylxylene, divinylnaphthalene, trivinylbenzene, divinyldiphenyl ether, divinyldiphenylsulfone, as well as diverse alkylene diacrylates and alkylene dimethacrylates. Preferred cross-liking monomers are divinylbenzene, trivinylbenzene, and ethylene glycol dimethacrylate. The monomers used in each polymerization step may be the same or different as those used in other steps, and may be used in combinations.

The proportion of crosslinking monomer in the copolymer seed particles is preferably sufficient to render the particles insoluble in subsequent polymerization steps (and also on conversion to an ion-exchange resin), yet still allow for adequate imbibition of the phase-separating diluent and monomers of the second monomer mixture. In some embodiments, no crosslinking monomer will be used. Generally, a suitable amount of crosslinking monomer in the seed particles is minor, i.e., desirably from about 0.01 to about 5 molar percent, preferably from about 0.1 to about 2.5 molar percent based on total moles of monomers in the seed particles, with the balance comprising the first monovinylidene monomer.

If used, the phase-separating diluents useful in conducting the invention are those which are a solvent for the monomers employed, but are non-solvents for the resulting copolymer. As such, the copolymer precipitates from the monomer phase as it is formed. Suitable phase-separating diluents are organic solvents which are substantially inert with respect to the suspending medium, monomers, and resulting copolymer. Generally, organic solvents having boiling points of at least about 60° C. are suitable and include aromatic hydrocarbons, aliphatic hydrocarbons, halogenated hydrocarbons, and aliphatic alcohols. Examples of suitable diluents are hexane, heptane, iso-octane (2,2,4-trimethylpentane), benzene, toluene, xylene, tert-amyl alcohol, n-butanol, sec-butanol, 2-ethylhexanol and decanol. Other phase-separating diluents are described in U.S. Pat. Nos. 4,224,415 and 3,176,482, the relevant teachings of which are incorporated herein by reference. The choice of diluent will depend on the particular monomers being polymerized as previously discussed. The amount of diluent used can also vary depending on the type and proportion of monomers employed, but generally an adequate amount will be from about 20 to about 50 weight percent, based on total weight of the second monomer mixture.

Polymerization of the first monomer mixture may be conducted to a point short of substantially complete conversion of the monomers to copolymer or, alternatively, to substantially complete conversion. If incomplete conversion is desired, the resulting partially polymerized seed particles advantageously contain a free-radical source therein capable of initiating further polymerization in subsequent polymerization stages. The term "free-radical source" refers to the presence of free-radicals, a residual amount of free-radical initiator, or both, which is capable of inducing further polymerization of ethylenically unsaturated monomers. In such an embodiment of the invention, it is preferable that from about 20 to about 95 weight percent of the first monomer mixture, based on weight of the monomers therein, be converted to copolymer, and more preferably from about 50 to about 90 weight percent. Due to the presence of the free-radical source, the use of a free-radical initiator in a subsequent polymerization stage would be optional. For embodiments where conversion of the first monomer mixture is substantially complete, it may be necessary to use a free-radical initiator in subsequent polymerization stages.

The free-radical initiator may be any one or a combination of conventional initiators for generating free radicals in the polymerization of ethylenically unsaturated monomers. Representative initiators are UV radiation and chemical initiators, such as azo-compounds like azobisisobutyronitrile; and per oxygen compounds such as benzoyl peroxide, t-butylperoctoate, t-butylperbenzoate and isopropylpercarbonate. Other suitable initiators are mentioned in U.S. Pat. Nos. 4,192,921; 4,246,386; and 4,283,499. The free-radical initiators are employed in amounts sufficient to induce polymerization of the monomers in a particular monomer mixture. The amount will vary, as those skilled in the art can appreciate, and will depend generally on the type of initiators employed, as well as the type and proportion of monomers being polymerized. Generally, an amount of from about 0.02 to about 2 weight percent is adequate, based on total weight of the monomer mixture.

The first monomer mixture used to prepare the seed particles is advantageously suspended within an agitated suspending medium comprising a liquid that is substantially immiscible with the monomers, preferably water. Generally, the suspending medium is employed in an amount from about 30 to about 70, and preferably from about 35 to about 50 weight percent based on total weight of the monomer mixture and suspending medium. Various suspending agents are conventionally employed to assist with maintaining a relatively uniform suspension of monomer droplets within the suspending medium. Illustrative suspending agents are gelatin, polyvinyl alcohol, magnesium hydroxide, hydroxyethylcellulose, methylcelluloses, and carboxymethylmethylcellulose. Other suitable suspending agents are disclosed in U.S. Pat. No. 4,419,245. The amount of suspending agent used can vary widely depending on the monomers and suspending agents employed.

The seed particles may be of any convenient size. In general, the seed particles desirably have a volume average particle diameter of from about 75 to about 1000 microns, preferably from about 150 to about 800 microns, and more preferably from about 200 to about 600 microns. The distribution of the particle diameters may be gaussian or uniform (e.g., 90 percent of the particles having diameters within +/−100 microns of the median particle diameter size). Volume average particle diameter may be determined by a commercially available instrument designed to make such measurement, such as a Criterion Model PC-320 Particle Size Analyzer available from the HIAC-Royco Company. Volume average particle diameter may also be determined by screen analysis, such as ASTM D-2187-74, using appropriate screen sizes.

Copolymer beads may be prepared by providing a plurality of the seed particles and, thereafter, adding the second monomer mixture such that the mixture is imbibed by the seed particles and polymerization conducted therein. This step is preferably conducted as a batch-seeded process or as an in situ batch-seeded process, as described hereinafter. The second monomer mixture may also be added intermittently or continuously under polymerizing conditions, such as in U.S. Pat. No. 4,564,644 previously discussed.

In the so-called batch-seeded process, seed particles comprising from about 10 to about 40 weight percent of the porous copolymer bead product are preferably suspended within a continuous suspending medium. A second monomer mixture containing a free radical initiator is then added to the suspended seed particles, imbibed thereby, and then polymerized. Although less preferred, the seed particles can be imbibed with the second monomer mixture prior to being suspended in the continuous suspending medium. The second monomer mixture may be added in one amount or in stages. The second monomer mixture is preferably imbibed by the seed particles under conditions such that substantially no polymerization occurs until the mixture is substantially fully imbibed by the seed particles. The time required to substantially imbibe the monomers will vary depending on the copolymer seed composition and the monomers imbibed therein. However, the extent of imbibition can generally be determined by microscopic examination of the seed particles. The second monomer mixture desirably contains from about 3 to about 25, preferably from about 5 to about 20 weight percent of crosslinking monomer based on total weight of monomers in the second monomer mixture, with the balance being the second monovinylidene monomer. In an in situ batch-seeded process, seed particles comprising from about 10 to about 80 weight percent of the porous copolymer bead product are initially formed by suspension polymerization of the first monomer mixture. The gel seed particles can have a free-radical source therein as previously described, which is capable of initiating further polymerization. Optionally, a polymerization initiator can be added with the second monomer mixture where the seed particles do not contain an adequate free radical source or where additional initiator is desired. In this embodiment, seed preparation and subsequent polymerization stages are conducted in situ within a single reactor. A second monomer mixture is then added to the suspended seed particles, imbibed thereby, and polymerized. The second monomer mixture may be added under polymerizing conditions, but is preferably added to the suspending medium under conditions such that substantially no polymerization occurs until the mixture is substantially fully imbibed by the seed particles. The composition of the second monomer mixture corresponds to the description previously given for the batch-seeded embodiment.

Conditions employed to polymerize ethylenically unsaturated monomers are well known in the art. Generally, the monomers are maintained at a temperature of from about 50° C. to about 90° C. for a time sufficient to obtain a desired degree of conversion. Typically, an intermediate temperature of from about 60° C. to about 80° C. is maintained until conversion of monomer to copolymer is substantially complete and, thereafter, the temperature is increased to complete the reaction. The resulting porous copolymer beads may be recovered from the suspending medium by conventional methods.

In general, strong acid resins are prepared by reacting the copolymer with a sulfonating agent such as sulfuric acid, chlorosulfonic acid, or sulfur trioxide. Contact with the sulfonating agent can be conducted neat, or with a swelling agent. Contact is typically conducted at temperatures from about 0° C. to about 150° C.

As indicated, the sulfonated cation exchange resins of the present invention are particularly suited for use in water treatment modules for treating power plant condensate water. In use, the subject resins are placed within an ion exchange bed. A water intake directs untreated water from the power plant condensate water loop into the bed where it contacts the subject resin. Once treated the water exits the bed by way of a water outtake where the treated water continues through the water loop and is recycled. Although not required, the subject cation exchange resins are preferably used in combination with an anion resin. These systems are optimized (operating pressures, flow rates, etc.) for operating conditions of a given power plant.

Specific Embodiments of the Invention

The following specific examples illustrate the invention and should not be construed as limiting the scope of the appended claims. The "seeded" copolymers described below were prepared using common suspension polymerization techniques as described in U.S. Pat. Nos. 4,564,644; 5,231,115 and Re, 34,112, each of which are incorporated herein in their entirety. Polymerization was conducted in a computer-automated 1-gallon stainless steel reactor that was jacketed for heating. The copolymer reactor was equipped with an agitator, a feed port, a drain valve, a vent valve, a nitrogen line, and a frangible. An additional feed line was used for continuous addition (i.e., "con-add") of monomer from a con-add tank into the reactor as described below.

EXAMPLE 1

Seed particles were made by preparing an aqueous phase composed of approximately 840 g of deionized water with 2.5 g of a 67 percent aqueous solution of dichromate solution and 360 g of a 1 weight percent solution of carboxy methyl methyl cellulose (CMMC) aqueous solution used as a suspension aide. An organic phase was added consisting of a crosslinking agent, divinylbenzene (DVB); a monovinylidene monomer, (styrene or isobomylmethacrylate (IBMA)); and an initiator (t-butylperoctoate and t-butylperbenzoate). The specific quantities of crosslinking agent and monovinylidene monomer used are indicated below in Table 1. Once the constituents were combined, the reactor was stirred at 25° C. for 60 minutes at 300 RPM to properly size the monomer droplets. The temperature was then ramped at 0.4° C./min to 70° C. and held at temperature for 860 minutes at 150 RPM. As a finishing step, a final ramp of 0.4° C./min to 110° C. was held for 2 hours. The reactor was than cooled to 25° C. and the copolymer seed particles were removed, washed, de-watered, air-dried and screened.

TABLE 1

| Sample | A | B | C | D | E | F |
|---|---|---|---|---|---|---|
| Wt % Crosslinking Agent in Monomer Mixture | 0.30 | 0.24 | 0.75 | 0.50 | 1.18 | 2.45 |
| Molar % Crosslinking Agent in Monomer Mixture | 0.51 | 0.41 | 0.60 | 0.41 | 2.00 | 2.00 |
| Organic Phase | | | | | | |
| Styrene (g) | 0 | 0 | 1191 | 1194 | 0 | 1170 |
| IBMA (g) | 1195.94 | 1160 | 0 | 0 | 1160 | 0 |
| DVB (55 wt %) (g) | 6.56 | 5.09 | 16.4 | 10.9 | 25.5 | 54.5 |

The seed particles were subsequently imbibed with a second polymer component according to the following procedure: approximately 300 g of dried and screened seed particles were added to an aqueous phase consisting of 775 g of deionized water, 20 g of a 1 weight percent sodium lauryl sulfate (SLS) aqueous solution and 3.3 g of a 67 weight percent aqueous dichromate solution. An imbibe monomer mixture of styrene and DVB were added while stirring to swell the copolymer seed. The imbibe phase was added over 15 minutes through the top port on the reactor and allowed to mix for 60 minutes at 230 RPM. After the 60 minute imbibe time a gelatin shot consisting of 250 g of hot deionized water, 20 g of 1 weight percent aqueous solution of SLS and 3.2 g of gelatin were added through the top port. The reactor was then sealed, ramped at 0.4° C./min to 78° C. and held for 600 minutes at 270 RPM.

A third polymer component was then added as a "con-add" portion. More specifically, styrene and DVB were added to the imbibed seeds over 200 to 300 minutes while the reactor was at 78° C. After the reaction had spent 600 minutes at 78° C. it was followed by a second ramp at 0.4° C./min to 110° C. where it was held for two hours. The reactor was then cooled to 25° C. and the copolymer was removed, washed, de-watered, air-dried and screened.

Table 2 provides the specific quantities of crosslinking agent and monovinyidene monomer that were used for each copolymer.

TABLE 2

| Sample | A | B | C | D | E | F |
|---|---|---|---|---|---|---|
| Molar % Crosslinking Agent in: S/IM/CA | 0.5/6.6/2.4 | 0.4/5.8/2.4 | 0.6/4.9/2.4 | 0.4/5.8/2.4 | 2/4.1/2.4 | 2/4.1/2.4 |
| Weight ratio of S/IM/CA | 1/1.24/1.43 | 1/1.24/2.86 | 1/1.24/1.43 | 1/1.24/2.86 | 1/0.6/2.66 | 1/0.6/2.66 |
| Seed Type | Acrylate | Acrylate | Styrenic | Styrenic | Acrylate | Styrenic |
| Imbibe Component (IM) in grams: | | | | | | |
| Styrene | 320.5 | 324.7 | 349.7 | 346.0 | 163.8 | 171.0 |
| DVB (55 wt %) | 54.5 | 47.4 | 40.6 | 47.3 | 16.2 | 16.4 |
| t-butylperoctoate | 0.54 | 0.54 | 0.54 | 0.54 | 0.54 | 0.54 |
| t-butylperbenzoate | 0.36 | 0.36 | 0.36 | 0.36 | 0.36 | 0.36 |
| Con-Add Component (CA) in grams: | | | | | | |
| Styrene | 416.1 | 832.0 | 416.1 | 832.0 | 774.1 | 774.0 |
| DVB (55 wt %) | 23.4 | 46.8 | 23.4 | 46.8 | 43.5 | 43.5 | wherein "S" designates the seed polymer component, "IM" designates the imbibed polymer component, "CA" designates the continuous addition polymer component. Samples C, D, and F do not form part of the present invention but are included for purposes of comparison.

The resins were then sulfonated in standard laboratory 5-liter three-neck, glass, round-bottom reactors. Each of these reactors were equipped with a glass shaft and Teflon™ paddle and two infrared heating lamps. 330 g of copolymer, 3300 g of 98 weight percent sulfuric acid and 330 g of methylene chloride. The methylene chloride addition was made over 15 minutes while the acid-copolymer slurry was being stirred. The temperature was ramped at 1° C./min to 115° C. and held for 2 hours before cooling. The acid-resin slurry was then slowly diluted by portions of lower concentration sulfuric acid and then washed in water.

Several of the sulfonated resins were then treated with an antioxidant, 2,6-di-t-butyl-α-dimethylamino-p-cresol using the following procedure: 1 liter of sulfonated resin was added to a 1 liter solution of deionized water containing 10 ml 1N HCl. With constant mixing, a solution of 2.1 g of 2,6-di-t-butyl-α-dimethylamino-p-cresol in 150 ml deionized water and 25 ml 1N HCl was added to the resin mixture over a 30-minute period. The resin mixture was stirred for an additional 30 minutes, followed by a rinse with deionized water.

The prepared cation exchange resins were subjected to an accelerated oxidation test after which the molecular weight distribution of the leachables released by the resin was measured by gel permeation chromatography. The results of the testing is provided in Table 3 below.

The accelerated resin oxidation procedure for the cation exchange resins comprised the following: 125 ml of the cation exchange resin was rinsed with 1.0 liter deionized water, then the resin and 625 ml deionized water were placed into a one liter flask with a condenser, stir paddle and glass bubbler. The resin was stirred at 60 rpm and heated at 80° C. for 14 days with a 20 cc/min flow of oxygen bubbling through the mixture. The mixture was cooled, the solution separated from the resin, and the molecular weight distribution of the leachables was measured.

Leachable analysis for each sample resin was conducted by way of gel permeation chromatography under the following conditions: Mobile phase, 0.05 M $Na_2SO_4$ with 1.00 ml 1 N NaOH per liter and pH adjusted to 8.0 with 5 percent $H_3PO_4$ at a flow rate of 0.40 ml/min, 25 μl injection volume and detector set at 229 nm calibration standards, sulfonated polystyrene (Na salt) from American Polymer Standards with weight average molecular weights (Mw)=41,000; 31,000; 17000; 6,500; 4,800. The average molecular weight for the leachable solutions were calculated for species with weights between 1,000 and 100,000 daltons. The specific equipment utilized included: Waters Assoc. liquid chromatography system composed of a 600E pump/controller, 712 WISP autosampler, 486 absorbance detector, Millennium 2.00 analysis software. Synchropak GPC100 (50×4.6 mm), GPC300 (250×4.6 mm), GPC100 (250×4.6 mm) columns in series.

Crud removal analysis was conducted pursuant to the procedure described in: T. Izumi, et. al., "Crud Removal Characteristics of Newly Developed Ion Exchange Resins ($2_{nd}$ Report)", Proc. 52nd Int. Water Conf., 1991, p. 454. The cation exchange resins (1220 ml) were mixed with a strong base anion exchange resin (756 ml) in the hydroxide form and placed in a 50 mm diameter column. Condensate water from a BWR nuclear power plant was flowed through the resin at about 3.5 liters/min. The level of iron in the water before (influent) and after (effluent) the resin column was analyzed several times each week by capturing the crud on a 0.45 um Millipore filter then measuring the iron using X-ray fluorescence spectroscopy.

Table 3 gives the crud removal performance after the condensate water had flowed through the resin for about 45 days. The molecular weight of the leachables released by the cation exchange resins is also given in Table 3.

TABLE 3

| Sample | Type of Cation Exchange Resin | Avg. Mw of Leachable (daltons) | Influent Iron (ppb) | Effluent Iron (ppb) | Crud Removal (%) |
| --- | --- | --- | --- | --- | --- |
| A | Acrylate | 5,000 | 18 | 0.1 | 99+ |
| C | Styrenic | 10,300 | 18 | 0.6 | 97 |
| B | Acrylate | 3,300 | 19 | 0.2 | 99 |
|   |          |       | 22 | 0.1 | 99+ |
| D | Styrenic | 22,000 | 18 | 0.7 | 96 |
|   |          |        | 24 | 2.5 | 89 |
| E | Acrylate | 3300 | 19 | 0.2 | 99 |
| F | Styrenic | 2600 | 15 | 3.0 | 80 |
|   |          |      | 23 | 5.1 | 76 | wherein "S", "IM" and "CA" are as defined. Samples C, D, and F do not form part of the present invention but are included for purposes of comparison.

The data provided in Table 3 shows that the replacement of some of the styrenic monomer in the copolymer with a non-styrenic monomer (e.g., an acrylate monomer) improves the crud removal performance of the cation exchange resin. The advantages include higher iron removal, long service cycle time and less sensitivity of the iron removal to the influent iron level—see for example Sample A versus C, B versus D, and E versus F. The data also shows that if the non-styrenic (e.g., acrylate) monomer replaces the styrenic monomer in the lowest crosslinked portion of the copolymer a significant reduction in the average molecular weight of the leachables released by the cation exchange resin is obtained—see for example Sample A versus C, and B versus D.

EXAMPLE 2

Seed particles were prepared by the procedure given in Example 1 using either isobornylmethacrylate or methylmethacrylate (MMA) as the monovinylidene monomer. The specific quantities of crosslinking agent and monovinylidene monomer used are indicated below in Table 4.

TABLE 4

| Sample | G | H | I |
| --- | --- | --- | --- |
| Wt % Crosslinking Agent in Monomer Mixture | 0.25 | 1.18 | 0.25 |
| Molar % Crosslinking Agent in Monomer Mixture Organic Phase | 0.42 | 2.0 | 0.19 |
| MMA (g) | 0 | 0 | 1197 |
| IBMA (g) | 1197 | 1174 | 0 |
| DVB (55 wt %) (g) | 5.45 | 25.7 | 5.45 |

The seed particles were subsequently imbibed with a second polymer component according to the following procedure: approximately 240 g of dried and screened seed particles were added to an aqueous phase consisting of 775 g of deionized water, 20 g of a 1 weight percent sodium lauryl sulfate (SLS) aqueous solution and 3.3 g of a 67 weight percent aqueous dichromate solution. An imbibe monomer mixture of styrene and DVB were added while sting to swell the copolymer seed. The imbibe phase was added over 15 minutes through the top port on the reactor and allowed to mix for 60 minutes at 230 RPM. After the 60 minute imbibe time a gelatin shot consisting of 250 g of hot deionized water, 20 g of 1 weight percent aqueous solution of SLS and 3.2 g of gelatin were added through the top port. The reactor was then sealed, ramped at 0.4° C./min to 78° C. and held for 600 minutes at 270 RPM. Then the temperature was increased at 0.4° C./min to 110° C. where it was held for two hours. The reactor was then cooled to 25° C. and the copolymer was removed, washed, de-watered, air-dried and screened. Table 5 provides the specific quantities of crosslinking agent and monovinylidene monomer that were used for each copolymer.

TABLE 5

| Sample | G | H | I |
|---|---|---|---|
| Molar % Crosslinking Agent in S/IM | 0.4/4.7 | 2/7.4 | 0.2/8.3 |
| Weight ratio of S/IM | 1/4.0 | 1/4.0 | 1/3.5 |
| Seed Component (S): | | | |
| Acrylate Seed Type | IBMA | IBMA | MMA |
| Weight % Crosslink Agent | 5.7 | 8.9 | 10.0 |
| Molar % Crosslink Agent | 4.7 | 7.4 | 8.3 |
| Imbibe Component (IM) in grams: | | | |
| Styrene | 902.4 | 902.4 | 691.2 |
| DVB (55 wt %) | 104.7 | 174.5 | 153.6 |
| t-butylperoctoate | 0.54 | 0.54 | 0.54 |
| t-butylperbenzoate | 0.36 | 0.36 | 0.36 |
| Iron Removal After Specified no. Days: | 45 days | 40 days | 7 days |
| Influent Iron (ppb) | 19 | 22 | 22 |
| Effluent Iron (ppb) | 0.2 | 1.1 | 0.1 |
| Crud Removal (%) | 99 | 95 | >99 |
| Cation Resin Leachable Test Results: | | | |
| Avg. Mw of Leachable (daltons) | 5,000 | 1,400 | 2,800 | wherein "S" designates the seed polymer component, "IM" designates the imbibed polymer component.

The copolymers were sulfonated using the procedures described in Example 1. The sulfonated resins were then treated with an antioxidant, 2,6-di-t-butyl-α-dimethylamino-p-cresol using the procedure described in Example 1.

The crud removal and the leachable molecular weight profile for the cation exchange resins were analyzed using the procedure described in Example 1. The data provided in Table 5 shows that cation exchange resins prepared from copolymers where some of the styrenic monomer has been replaced by a non-styrenic monomer (e.g., acrylate) are effective for crud removal from water. The average molecular weight for leachables released by styrenic resins with crosslink levels of 0.2 percent, 0.4 percent and 2.0 percent are expected to be about 60,000, 30,000 and 6,000, respectively. The data in Table 5 also shows that the replacement of the styrenic monomer in the low crosslinked portion of the copolymer with a non-styrenic (e.g., acrylate) monomer resulted in a significant reduction in the average molecular weight of the leachables released by the cation exchange resin.

EXAMPLE 3

A macroporous cation exchange resin was prepared using the following conditions. Seed particles were prepared by the procedure given in Example 1 using 1198 g isobornyb- nethacrylate and 4.37 g divinylbenzene. The seed particles were subsequently imbibed with a second polymer component according to the following procedure: 200 g of dried and screened seed particles were added to an aqueous phase consisting of 775 g of deionized water with 2.5 g sodium dichromate and 2.2 g carboxymethylmethylcellulose. An imbibe monomer mixture of 455 g styrene, 95 g divinylbenzene, 450 g isooctane, 1.63 g t-butylperoctoate and 1.09 g t-butylperbenzoate were added over 15 minutes while stirring to swell the copolymer seed. After 60 minutes at 230 RPM the mixture was heated to 80° C. and held for 900 minutes at 270 RPM. The temperature was then increased to 110° C. where it was held for 300 minutes. The reactor was then cooled to 25° C. and the copolymer was washed with deionized water. The isooctane was removed by steam stripping at 100° C., and the copolymer was washed with deionized water, air-dried and screened. The copolymer was sulfonated following the procedure in Example 1 using 330 g copolymer and 3200 g 98 percent sulfuric acid at 130° C. for 110 minutes. The leachable molecular weight profile for the cation exchange resin was analyzed using the procedure described in Example 1. The average leachable molecular weight was 1,600. The crud removal performance was measured using the procedure described in Example 1. After seven days, the influent iron level was 22 ppb and the effluent iron level was less than 0.1 ppb to give a crud removal efficiency of greater than 99 percent.

What is claimed is:

1. A process for treating power plant condensate water containing colloidal iron by contacting the condensate water with a sulfonated ion exchange resin comprising copolymer beads having an interpenetrating polymer network of multiple polymer components comprising:
   a first polymer component derived from a first monomer mixture comprising: a first monovinylidene monomer having a styrenic content less than about 80 molar percent and an optional first crosslinking agent; and
   a second polymer component derived from a second monomer mixture comprising: a second monovinylidene monomer having a styrenic content greater than about 50 molar percent and a second crosslinking agent;
   wherein the ratio of the molar percent crosslinking agent of the first polymer component to the second polymer component is less than about 0.7.

2. The process of claim 1 wherein the first polymer component is derived from a monomer mixture having a styrenic content less than about 50 molar percent.

3. The process of claim 2 wherein the first monovinylidene monomer has a styrenic content less than about 10 molar percent and the first monomer mixture comprises less than about 5 molar percent of crosslinking agent.

4. The process of claim 3 wherein the first monovinylidene monomer mixture comprises less than about 1 molar percent crosslinking agent.

5. The process of claim 3 wherein the second monovinylidene monomer has a styrenic content of greater than about 90 molar percent.

6. The process of claim 1 wherein the first polymer component is derived from a monomer mixture having greater than 20 molar percent of an acrylate.

7. The process of claim 6 wherein the first polymer component is derived from a monomer mixture having greater than about 50 molar percent of an acrylate.

8. The process of claim 1 wherein the ratio of the molar percent crosslinking agent of the first polymer component to the second polymer component is less thin about 0.4.

9. The process of claim 8 wherein the ratio of the molar percent crosslinking agent of the first polymer component to the second polymer component is less than about 0.1.

10. The process of claim 1 wherein the first monovinylidene monomer comprises a non-styrenic monomer including at least one of the following functional groups: acrylate, methacrylate, butadiene, ethylene, propylene, acrylonitrile, and vinyl chloride.

11. The process of claim 10 wherein the first monovinylidene monomer includes at least one of an acrylate and methacrylate.

12. The process of claim 11 wherein the first monovinylidene monomer includes isobornylmethacrylate.

13. The process of claim 1 wherein the copolymer beads are macroporous.

14. The process of claim 1 wherein the copolymer beads are macroporous.

15. The process of claim 1 wherein the copolymer beads are formed by seeded polymerization.

16. The process of claim 15 wherein the first polymer component comprises microporous seed particles wherein the seed particles are imbibed with a monomer mixture which is polymerized to form an interpenetrating polymer network with the seed particles.

17. The process of claim 16 wherein the imbibed seed particles are contacted with a continuous addition of a monomer mixture to form an interpenetrating polymer network.

18. The process of claim 15 wherein the first polymer component comprises microporous seed particles which are contacted with a continuous addition of a monomer mixture to form an interpenetrating polymer network.

19. The process of claim 1 wherein the sulfonated ion exchange resin is used in combination with an anion exchange resin.

* * * * *